United States Patent [19]

Hong et al.

[11] Patent Number: 4,488,968
[45] Date of Patent: Dec. 18, 1984

[54] REMOVAL OF PHOSPHATES AND BOD FROM WASTEWATERS

[75] Inventors: Sun-Nan Hong, Emmaus; Marshall L. Spector, Allentown, both of Pa.

[73] Assignee: Air Products and Chemicals, Inc., Allentown, Pa.

[21] Appl. No.: 472,513

[22] Filed: Mar. 7, 1983

[51] Int. Cl.$^3$ ............................................. C02F 3/30
[52] U.S. Cl. ................................. 210/605; 210/625; 210/906
[58] Field of Search ............... 210/605, 621, 622, 624, 210/625, 630, 903, 906

[56] References Cited

U.S. PATENT DOCUMENTS 3,654,147 4/1972 Levin et al. ........................ 210/625
4,056,465 11/1977 Spector ............................. 210/605
4,271,026 6/1981 Chen et al. ......................... 210/605

Primary Examiner—Thomas Wyse
Attorney, Agent, or Firm—Thomas G. Ryder; E. Eugene Innis; James C. Simmons

[57] ABSTRACT

The treatment of wastewater with activated biomass to remove BOD and phosphorus values in a system in which the wastewater influent is initially mixed with recycled active biomass in an anaerobic zone and then subjected to aeration in an oxic zone, wherein the residence time of the mixed liquor in the oxic zone is reduced. At least part of the biomass-containing sludge separated from the mixed liquor subjected to further oxidation in a separate zone before admixture with the wastewater influent.

4 Claims, 2 Drawing Figures

REMOVAL OF PHOSPHATES AND BOD FROM WASTEWATERS

TECHNICAL FIELD

The present invention relates to improvements in a particular type of activated biomass process designed for effective removal of phosphates from a wastewater stream in addition to removal of BOD (Biological Oxygen Demand).

BACKGROUND OF THE PRIOR ART

In prior U.S. Pat. No. 4,056,465 a wastewater treating process is described in which the mixed liquor is initially formed by admixture of wastewater influent with recycled sludge in an anaerobic zone and such mixed liquor is thereafter passed to an oxic zone where it is subjected to oxidizing treatment. The oxidized mixed liquor is subsequently passed to a settling zone from whence a portion of the activated biomass is recycled to the initial anaerobic zone. The process of the patent is particularly applicable for treatment of phosphate-containing wastewater influent. By the initial treatment of the mixed liquor under anaerobic conditions as described in said patent, there is a selective production of nonfilamentous microorganisms capable of sorbing BOD under both anaerobic and oxidizing conditions and also capable of accumulating phosphates under oxidizing conditions. When the anaerobically treated mixed liquor is subsequently subjected to treatment with oxygen-containing gas under oxic conditions, the BOD therein is oxidized while phosphates are caused to accumulate in the solid biomass components. A portion of this biomass, separated from the oxidized liquor in a subsequent setting operation, is recycled to the anaerobic treating zone to provide the desired active biomass for initial admixture with wastewater influent. By maintaining the initial anaerobic treating zone substantially free of $NO_x^{31}$ (i.e. less than about 0.3 ppm and preferably less than about 0.2 ppm expressed as elemental nitrogen) and the dissolved oxygen content of the mixed liquor in that zone at below 0.7 ppm and preferably below 0.4 ppm, the selective production of non-filamentous microorganisms capable of sorbing BOD is promoted, which micro-organisms are also capable of storing polyphosphates under the oxidizing conditions subsequently encountered in the oxic treating zone.

The aforesaid U.S. Pat. No. 4,056,465 also describes a variation of the basic process wherein the mixed liquor is passed from the anaerobic zone to an anoxic zone (i.e. one containing $NO_x^{31}$ initially at least about 0.5 ppm but less than 0.7 ppm and preferably less than 0.4 ppm dissolved oxygen), positioned intermediate the anaerobic and oxic zones. In this modification there is an internal recycle of mixed liquor from the oxic zone back to the anoxic zone, thus providing the $NO_x^-$ in the anoxic zone. The alternative modification including the intermediate anoxic treatment of the mixed liquor, is employed for effecting denitrification of the mixed liquor.

As explained in U.S. Pat. No. 4,271,026, the removal of phosphorous from wastewater in traditional oxygenating systems has not always been consistent, i.e. sometimes it worked and sometimes it did not. In all such prior art processes an extensive treating period is required ranging upwards of 15 to 20 hours or more. While in operations carried out under the conditions advocated in aforesaid U.S. Pat. No. 4,056,465, phosphate removal from the wastewater influent was always present, the extent or rate of phosphorus removal varied significantly, and there was no means provided for controlling the process to insure enhanced phosphorus removal, high rate processing and a basis for optimizing design of the system. The U.S. Pat. No. 4,271,026 discloses operating conditions under which enhanced phosphorus removal is better assured at adequately high rate process operations. This is accomplished, according to the U.S. Pat. No. 4,271,026, by maintaining a particular set of interrelated operating conditions within a specific envelope in the type of process wherein recycled activated biomass is mixed with a wastewater influent containing phosphate and BOD under anaerobic conditions, thereby promoting selective production of the desired type of non-filamentous microorganisms (capable of storing phosphorus as phosphates under oxidizing conditions). In a subsequent oxic zone the mixed liquor is treated with oxygen-containing gas to oxidize BOD and to effect storage of phosphate in the biomass. As in the previous U.S. Pat. No. 4,056,465, the anaerobic treating zone is maintained substantially free of $NO_x^-$ or other oxidizing agents and the dissolved oxygen level anywhere in the zone at less than about 0.7 ppm.; the subsequent oxygenation of the mixed liquor is carried out in the oxic zone at a dissolved oxygen level of at least and preferably above 1 ppm anywhere in the zone. To obtain the desired and assured enhancement in phosphorus removal, the U.S. Pat. No. 4,271,026 advocates that there be maintained throughout the treating stages of the process (up to but not including the separation of supernatant liquor from settled biomass) a BOD/P ratio from about 5:1 and up to about 50:1 and an F/M ratio from about 0.09 up to an upper limit of about 1.4.

In pending patent application Ser. No. 282,674 filed July 13, 1981 further improvements are disclosed applicable to wastewater treating systems of the type hereinabove described, by which substantial savings in operating costs can be achieved with effective BOD removal from wastewater influent, while obtaining dense sludge of good settling characteristics and desired high to adequate removal of phosphate. The cost savings stem chiefly from modifications achieving lower oxygen consumption and lowered power requirements for oxygen mass transfer as compared to conventional wholly aerobic activated sludge systems or other prior art systems, such as of the type disclosed in U.S. Pat. No. 4,056,465, which employ one or more anaerobic stages in conjunction with one or more aerobic stages. The operating conditions advocated in said pending patent application include (1) initial mixing of the recycled biomass with wastewater influent in a BOD sorption zone under selected conditions such that less than 5% of the total $BOD_5$ is oxidized by oxygen or other agents while at least 25% of the soluble BOD becomes sorbed by the biomass; (2) subsequently subjecting the mixed liquor to controlled aeration conditions so that the dissolved oxygen level remains below 1 ppm and whereby at least 30% of the total $BOD_5$ separate out the more dense sludge, a portion of which is recycled to the initial BOD absorption zone.

SUMMARY OF THE INVENTION

The present invention provides further improvements in the operation of A/O systems of the type described in prior U.S. Pat. Nos. 4,056,465 and 4,271,026, enabling operation at high throughput rates and at substantially lower system volume and accompanying lower capital investment, while maintaining the desired ranges of F/M ratio and BOD/P ratio advocated in the U.S. Pat. No. 4,271,026 assuring the desired enhanced phosphorous removal from the wastewater. These desired objectives are achieved, in accordance with the present invention, by providing a lower residence time (reduced volume) for treatment of the mixed liquor in the oxic treating stage, while maintaining the total residence time to which the recycled activated sludge is exposed approximately equal to or less than the levels heretofore employed in systems of this type. To bring the recycled sludge portion to the desired condition for admixture with the influent wastewater admitted to the treating system, such recycled sludge portion after separation from the mixed liquor, is further separately treated under oxic conditions with oxygen-containing gas before its admixture with the influent wastewater.

The operation in accordance with the present invention will be understood and its advantages further appreciated from the detailed description which follows read in conjunction with the accompanying drawings.

DETAILED DESCRIPTION

In order to appreciate the principle of the present invention one must understand the operation of a "conventional" plant of the kind described in U.S. Pat. Nos. 4,056,465 and 4,271,026, or other such systems employing the wastewater treating sequence anaerobic, oxic, settled sludge recycle, with or without an anoxic stage intermediate the anaerobic and oxic stages. These terms are herein employed generally in a similar manner as in the patents hereinbefore referred to. Wastewater treating plants or systems of the type illustrated in the U.S. Pat. No. 4,056,465 are identified by Applicant's assignee by its trademark "A/O". This trademark is presently employed in connection with systems having an initial anaerobic zone and a subsequent oxygenation zone. Systems of the type illustrated in FIG. 1 of said patent, provided with the intermediate anoxic zone, are sometimes referred to as "A/A/O" and identified by the trademark "A$^2$/O".

"Anaerobic" conditions, as used herein, refer to a state existing within a wastewater treating zone in which the influent and recycle sludge are initially mixed wherein at least twenty-five percent (25%), and preferably at least fifty percent (50%), of the soluble BOD$_5$ content of the influent wastewater is transferred from the aqueous phase of the mixed liquor to the solid sludge, but wherein oxidation is limited so that no more than 4 or 5% and preferably less than 1% of the total BOD$_5$ be satisfied by reaction with either oxygen or other oxidizing agents (such as nitrite and/or nitrate, NO$_x^-$). During startup, the oxidation is limited even further such that less than 2% and preferably less than 1% of the total BOD$_5$ is satisfied by reaction with oxygen or oxidizing agents. Such anaerobic conditions usually require a dissolved oxygen content throughout the zone of less than 0.7 ppm, preferably less than 0.4 ppm, and especially less than 0.1 ppm. It is also necessary that oxidizing agents, such as NO$_x^{31}$, be limited to very low levels, such as less than 0.3 ppm, preferably less than 0.2 ppm NO$_x^-$ expressed as elemental nitrogen.

"Oxic" conditions, as used herein, refer to a state existing within a wastewater treating zone in which initially anaerobically formed mixed liquor is contacted with oxygen and/or oxidizing agents for a time sufficient to oxidize at least thirty percent (30%) of the total BOD$_5$ present in the initial wastewater influent. Although the D.O. content of this type zone has traditionally been maintained at levels of 1 ppm or greater, the D.O. level can be substantially less than 1 ppm at various points throughout the zone (e.g., an average of about 0.5 or even 0.2 ppm). The only requirement being to provide sufficient oxygen transfer to oxidize the minimum percentage of BOD$_5$ as stated above.

Figure 1:
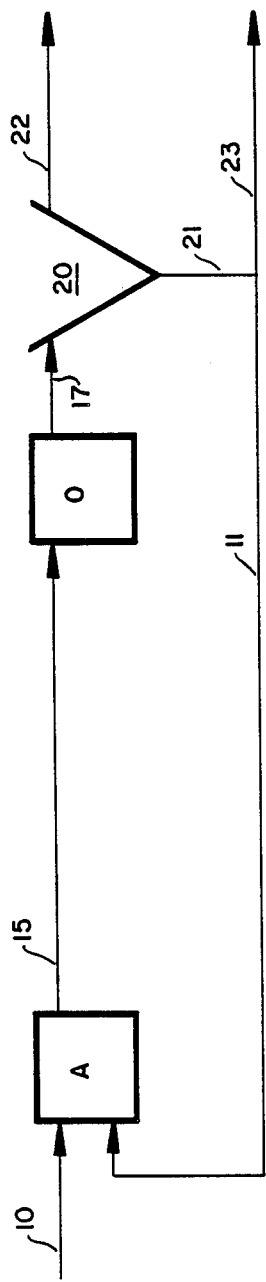
FIG. 1 of the accompanying drawings is a simplified block flow diagram of a system operated in accordance with the prior art.

Referring now to FIG. 1 of the drawings, the wastewater initially enters the anaerobic treating zone A via line 10 and is admixed with the recycled sludge admitted to zone A via line 11. In addition to refraining from introduction of oxygen-containing gas, anaerobic conditions may be maintained in zone A by blanketing the liquid surface with nitrogen or other inert gas or by providing that zone with a physical cover. Also, if desired, nitrogen gas may be bubbled up through the liquid to strip any oxygen therefrom. Zone A can be a single treating stage or it may be divided by partitions or otherwise to provide a plurality of separate interconnected hydraulic stages, in order to approach a plug flow system.

The mixed liquor from zone A is withdrawn by line 15 and may be passed directly into the oxic treating zone 0 via line 16. As in Zone A, Zone 0 may be a single treating zone or may be divided into a plurality of interconnected hydraulic stages. In Zone 0 the mixed liquor is contacted with oxygen-containing gas, which may be atmospheric air or a gas stream of higher oxygen concentration, as is now well known in the art. The oxidized liquor is withdrawn from Zone 0 via line 17 and introduced into a settling zone such as a clarifier indicated at 20. The more dense sludge settles to the bottom of the clarifier, from which it is withdrawn by line 21, while the supernatant liquid is withdrawn by line 22. A portion of the dense sludge from line 21 is recycled to zone A via line 11, while the remainder of the dense sludge is discharged through line 23 for treatment or dispostion as is well known in the art.

For a fuller understanding of details involved in the operation of systems such as that illustrated by the flow diagram of FIG. 1, one may refer to prior U.S. Pat. Nos. 4,056,465 and 4,271,026, the disclosures of which are herein incorporated by reference.

Figure 2:
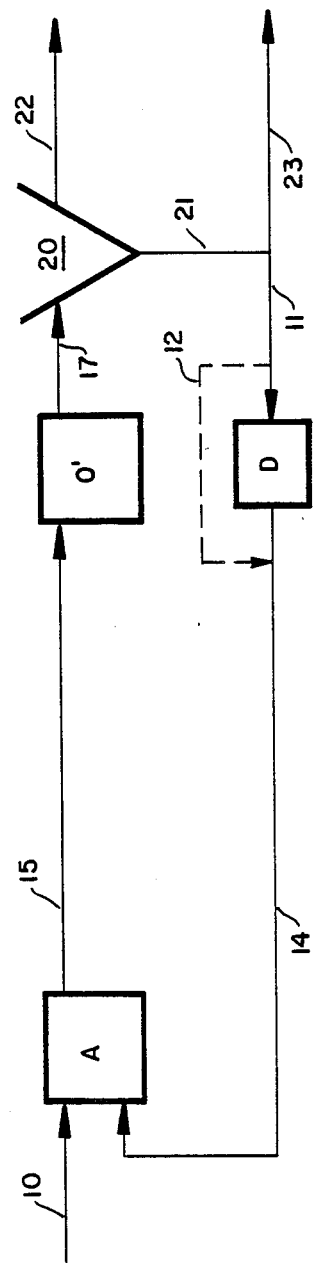
FIG. 2 is a simplified block flow diagram of a system operated in accordance with the present invention.

The system of FIG. 2, except for the differences hereinafter described, is substantially the same as that of FIG. 1, and like reference characters identify simillar elements. The principal differences between the systems of FIGS. 1 and 2 as applied to an A/O system is that in the latter system the volumetric capacity of the oxic treating zone 0' is substantially less than that of the otherwise corresponding zone 0 of FIG. 1, thereby shortening the residence time of the mixed liquor during the oxygenation stage. Also, the separated sludge from the clarifier 20 is not returned directly to zone A. In accordance with the present invention, as illustrated in FIG. 2, at least a portion of the sludge withdrawn from line 21 via line 11 is sent to a small supplementary oxic zone D where it is subjected to further contact with oxidizing gas before being introduced into zone A via line 14.

A detailed study of what takes place in the oxic zone of a plant such as that depicted in FIG. 1, can be made by considering that zone as being divided into a series of stages or by examining the behavior of related systems operated in a batch mode. Such study reveals that the uptake of phosphorus and soluble BOD by the biomass entering the oxic zone from the anaerobic (or optional anoxic) zone is rapid and requires only a fraction of the total system volume or equivalent detention time. A study carried out reveals that the rate of oxidaton of BOD by the biomass entering the oxic zone from the anaerobic zone is rapid in the intial portion of said oxic zone and is considerably slower in the latter portion of said zone. The mixed liquor is largely depleted of soluble phosphates and exhibits a substantially lower rate of oxygen respiration at the exit end of the oxic zone.

By operation in accordance with the present invention, means are provided for substantially reducing the total system volume without reducing the available retention time needed for adequate oxidation of sorbed BOD. The features of the present invention can be illustrated by comparing plant operation in the conventional manner of Example 1, with the operation of a plant of the same capacity according to the invention as detailed in Example 2.

EXAMPLE 1

A wastewater treatment plant (as in FIG. 1) is operated to handle 75,000 $M^3$ (about 20 million gallons) of influent per day. This influent contains 120 ppm (0.12 kg/$M^3$=9,000 kg total) of soluble BOD and 12 ppm (0.012 kg/$M^3$=900 kg total) of soluble phosphate, expressed as elemental P (BOD/P=10). The plant has a total influent detention time (IDT) of 0.12 days (2.88 hours) based on a total system volume of 9,000 $M^3$. The anaerobic zone (A) comprises one-third or 3,000 $M^3$ of the total system and the oxic zone (0) two-thirds or 6,000 $M^3$. The concentration of mixed liquor volatile suspended solids (MLVSS) in both the anaerobic and oxic zones is 2.5 kg/$M^3$ (2500 ppm). The total biomass is 22,500 kg (9000×2.5). The F/M ratio of this plant is 0.4 (9000÷22,500). In the clarifier 20, the sludge is concentrated six-fold to provide a recycle stream having an MLVSS of 15 kg/$M^3$ at a recycle ratio of sludge/influent of about 19%. Such plant is operating in the optimum region set out in the U.S. Pat. No. 4,271,026 and effectively removes both BOD and P.

EXAMPLE 2

A wastewater treating plant of the same capacity as that in Example 1 is modified to introduce the features of FIG. 2, by reducing the volumetric capacity of the oxic zone 0 from 6000 $M^3$ to 3,000 $M^3$ (zone 0' of FIG. 2). An additional aeration tank D is provided in the sludge recycle line 11; tank D having a capacity of 500 $M^3$. Thus the total system flows remain the same. Because the sludge flowing through the recycle line is concentrated six-fold in VSS, the total amount of biomass in the system remains at 22,500 kg despite the fact that the volume of total oxic zone has been decreased by 42%. The calculated residence time in oxic zones remains about the same or, in fact, is slightly increased from the 1.61 hours of Example 1 to 1.65 hours by operation in accordance with Example 2. The F/M ratio and the BOD/P ratio in Example 2 remain substantially the same as that in Example 1.

Because operation of the system of FIG. 2, as shown by Example 2, provides the same residence time in the various phases of the process, it is equally effective as the process of Example 1. The great advantage afforded by the Example 2 operation, however, is in the substantially reduced capital investment for required tankage for a plant of the same given treating capacity.

By aerating the recycle sludge in accordance with the invention, unoxidized food stored in the biomass is metabolized and thus the recycled biomass can function properly upon the BOD in the wastewater influent with which the biomass is admixed in the anaerobic zone. In addition, any bleed back of P from the sludge to the liquor which occurs in the sludge blanket of clarifier 20 is reversed during oxidaton in zone D, thus minimizing the concentraton of soluble P introduced into the anaerobic zone A by the sludge recycle of line 14 relative to that of line 11. If it is determined that excessive quantities of any nitrogen compounds are being oxidized in zone D and recycled to zone A, as $NO_x$, a portion of the recycle sludge can by-pass zone D by means of line 12. Additionally, by-passing zone D via line 12 can also be used to adjust F/M. In this way greater flexibility is provided in optimizing F/M with respect to the phosphate removal rate for a given BOD/P ratio in the wastewater influent. Without the added flexibility provided by the present invention, a high F/M ratio in a typical A/O system, may result in excess storage of unmetabolized food in the biomass with resulting loss of BOD sorption capacity in the anaerobic zone. If this occurs excessively the system would lose its function of removing phosphorus in the oxic section. By the system of the present invention, on the other hand, with the provision of a relatively small basin for oxidation of the recycled sludge, food stored in the biomass is adequately metabolized and thus the biomass is enabled to maintain the desired capacity for sorption of BOD in the anaerobic zone and P in the oxic zone.

In general the advantages of the present invention are achieved by operation of A/O systems under conditions such that the influent detention time of the mixed liquor in the oxic zone is from about 0.5 to about 2 hours and from 0.2 to 1.5 hours of equivalent oxidation time is effected in the concentrated sludge recycle wherein it is subjected to further oxidative treatment with oxygen-containing gas before said recycled sludge is mixed with the wastewater influent to be treated. The overall operation in practice of the invention should be so controlled that the F/M ratio is in the range from about 0.09 to about 1.4, preferably above about 0.2; the ratio of BOD/P is in the range from about 5 to 50, and preferably in a relative relation to each other such that the BOD/P increases directly as F/M is increased. The oxidation of the concentrated recycle sludge may be carried out generally at any convenient DO level, including levels approaching zero. If desired, however, one may employ in the oxidation of the mixed liquor conditions different from that employed in the oxidation of the mixed liquor in zone 0', provided however, that at least 50% of BOD (total) demand is satisfied over the entire system.

What is claimed:

1. In an activated biomass process wherein recycled activated biomass is (1) initially admixed with a phosphate- and BOD-containing wastewater influent to form a mixed liquor under anaerobic conditions effecting selective production of microorganisms capable of sorbing BOD under both anaerobic and oxidizing conditions, followed by (2) subjecting the mixed liquor to contact with oxygen-containing gas under oxic treating conditions effecting accumulation of phosphates in solid biomass component, and (3) subsequently separating the thus oxidized mixed liquor into supernatant liquid and biomass, a portion of which biomass is returned to said admixture with the wastewater influent to provide the aforesaid activated biomass; the improvement which comprises:

maintaining the mixed liquor in contact with oxygen-containing gas under said oxic conditions for a time sufficient to cause sorption of BOD and P from the surrounding liquor, but less than that required to effect 40% oxidation of the sorbed BOD, and separately subjecting at least part of the recycled portion of the biomass to further oxidation by contact high oxygen-containing gas prior to admixture of said recycled biomass with the wastewater influent, such that any bleed back of phosphorus from the sludge to the liquor is reversed during the separate oxidation and at least 50% of the total soluble and insoluble BOD is removed in the overall process.

2. The improvement as defined in claim 1 as applied to a process wherein the process system encompassing the initial anaerobic treatment and extending up to, but not including, said separation step, the BOD/P ratio is maintained from about 5:1 up to about 50:1 expressed respectively as milligrams soluble BOD per liter of influent and soluble phosphorus expressed as milligrams elemental phosphorus per liter of influent and wherein further the F/M ratio is maintained from about 0.09 to about 1.4, said F being the total weight of soluble BOD introduced into the process per 24-hour day and said M is the weight of volatile suspended solids in the process system.

3. The improvement as defined in claim 2 wherein the F/M ratio is at least 0.2.

4. Process as defined in claims 1 or 2 wherein said mixed liquor is maintained in contact with oxygen-containing gas under oxic conditions for a period of from 0.5 to 2 hours.

* * * * *